(12) United States Patent
Hasegawa et al.

(10) Patent No.: US 8,678,521 B2
(45) Date of Patent: Mar. 25, 2014

(54) VEHICULAR BRAKE CONTROL SYSTEM FOR VEHICLE

(75) Inventors: Tetsuya Hasegawa, Nagano (JP); Tooru Koyama, Nagano (JP); Genichi Hatakoshi, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 1877 days.

(21) Appl. No.: 11/382,209

(22) Filed: May 8, 2006

(65) Prior Publication Data

US 2006/0250022 A1 Nov. 9, 2006

(30) Foreign Application Priority Data

May 9, 2005 (JP) ................. P.2005-135657

(51) Int. Cl.
*B60T 13/00* (2006.01)
(52) U.S. Cl.
USPC ............................................. 303/9.64
(58) Field of Classification Search
USPC ............ 303/9.61, 9.64, 9.69, 9.71, 137; 188/349
See application file for complete search history.

(56) References Cited

U.S. PATENT DOCUMENTS

| | | | |
|---|---|---|---|
| 4,289,359 A * | 9/1981 | Lupertz et al. | 303/9.64 |
| 4,465,322 A * | 8/1984 | Hayashi | 303/9.64 |
| 5,273,346 A | 12/1993 | Tsuchida et al. | |
| 5,620,237 A * | 4/1997 | Iwashita et al. | 303/9.64 |
| 7,188,911 B2 * | 3/2007 | Tani et al. | 303/9.64 |
| 7,461,905 B2 * | 12/2008 | Hamm et al. | 303/9.64 |
| 2003/0015916 A1 * | 1/2003 | Sakamoto | 303/137 |
| 2003/0230932 A1 * | 12/2003 | Chen et al. | 303/137 |
| 2005/0146207 A1 * | 7/2005 | Wagner | 303/9.64 |

FOREIGN PATENT DOCUMENTS

| | | |
|---|---|---|
| DE | 1 0237102 | 2/2004 |
| DE | 10237102 A1 * | 2/2004 |
| EP | 0518375 | 12/1992 |
| EP | 1277635 | 1/2003 |
| JP | 2000 071963 | 3/2000 |
| JP | B2-3451790 | 8/2003 |

* cited by examiner

*Primary Examiner* — Xuan Lan Nguyen
(74) *Attorney, Agent, or Firm* — Andrew M. Calderon; Roberts Mlotkowski Safran & Cole, P.C.

(57) ABSTRACT

A brake control system includes at least a pair of brake systems respectively connected to a pair of brake operating members L1, L2, and a control unit 10 for controlling the brake forces of the pair of brake systems interlockingly according to a predetermined distribution ratio by operating one of the pair of brake operating members L1, L2. The control unit 10 executes a decreasing control on the brake forces in such a manner that, when releasing the pair of brake operating members L1, L2, the control unit 10 decreases both of the brake forces together, even in a state where the control unit performs the interlocking control so as to decrease the brake force of one of the brake system as the brake force of the other of the brake system is increased in accordance with the predetermined distribution ratio.

3 Claims, 5 Drawing Sheets

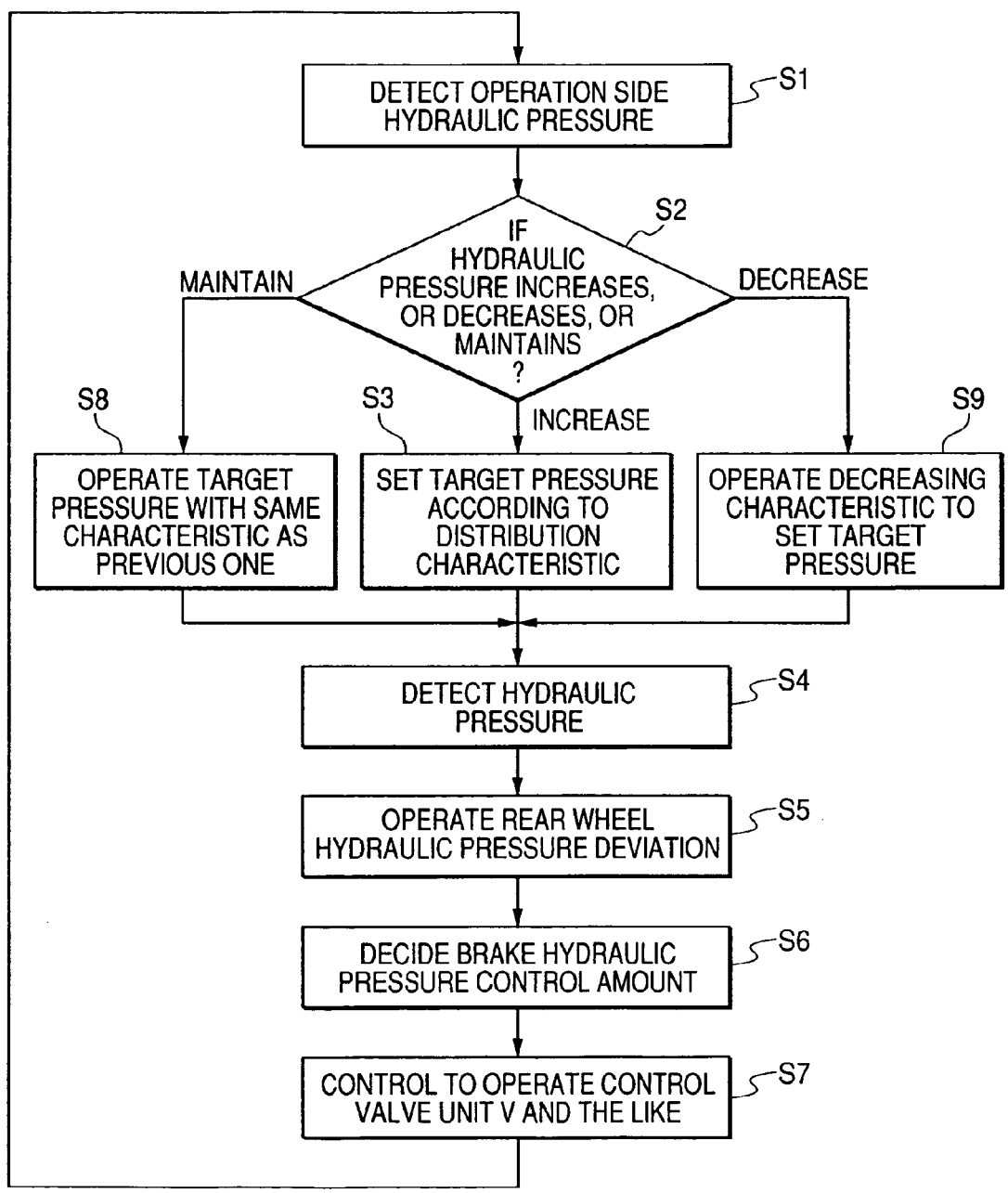

VEHICULAR BRAKE CONTROL SYSTEM FOR VEHICLE

BACKGROUND OF THE INVENTION

1. Field of the Invention

The present invention relates to a brake control system for a vehicle. In particular, the present invention relates to such a brake control system which can be mounted on a bar-handle type vehicle such as a motorcycle, a tricycle, and an all-terrain vehicle (ATV).

2. Description of the Background Art

Conventionally, there is a vehicular brake control system electrically controlling brake hydraulic pressure of a vehicle to thereby apply brake force to the vehicle (for example, see Japanese Patent Examined Publication No. JP-B-3457190).

The brake control system disclosed in JP-B-3457190 is structured such that a distribution ratio of the brake forces in the interlocking brakes of the front and rear wheels of a motorcycle is set so as to correspond to an ideal brake force distribution curve. (This interlocking brake is also called as combination brake) Normally, the ideal brake force distribution curve of the motorcycle has a chevron-shaped characteristic that: in a range where the brake force is small, the brake force of the rear wheel rises as the brake force of the front wheel rises, whereas, in a large brake force range, the brake force of the rear wheel decreases as the brake force of the front wheel increases.

In the above-cited vehicular brake control system, not only in a brake applying time but also in a brake releasing time, decompression control is made using the interlocking braking operation of the front and rear wheels corresponding to the ideal brake force distribution curve. Therefore, for example, in a state where the interlocking braking operation is under execution in the vicinity of maximum brake force of the ideal brake force distribution curve, when the brake operating member on the front wheel side is released, there is developed the following characteristic: that is, as the brake force of the front wheel side decreases correspondingly to the ideal brake force distribution curve, the brake force of the rear wheel side reversely tends to increase and, after then, it decreases. In the brake releasing operation where such the characteristic is generated, in a process where the brake forces of the front and rear wheels decrease, there occurs a phenomenon that the brake force on the rear wheel side increases temporarily. This makes a rider feel uncomfortable and thus impairs the riding feeling of the motorcycle.

SUMMARY OF THE INVENTION

In view of the above conventional circumstances, it is an object of the invention to provide, a brake control system, which is used in a vehicle in which brake force of the pair of the braking systems are interlockingly controlled, and enables to reduce the uncomfortable feeling given to the rider when releasing the braking members and thus enhances the riding feeling of the vehicle.

In attaining the above object, according to the invention, there is provided a brake control system for a vehicle, comprising:
at least a pair of brake operating members;
a pair of brake systems respectively connected to the pair of brake operating members and applying brake force respectively; and
a control unit which performs interlocking control controlling the brake force of the pair of the brake systems according to a predetermined distribution ratio, when one of the pair of brake operating members is operated, wherein
when either one of the pair of the operating members is loosened, the control unit performs decreasing control so as to decrease both of the brake force of the pair of the brake systems, even in a state where the control unit performs the interlocking control so as to decrease the brake force of one of the brake system as the brake force of the other of the brake system is increased, in accordance with the predetermined distribution ratio.

According to the vehicular brake control system of the invention, when one of the pair of brake operating members is operated, the brake force of the pair of brake systems are interlockingly controlled according to the predetermined distribution ratio by the control unit. During execution of the interlocking control, when either one of the pair of the operating members is loosened, the control unit performs decreasing control so as to decrease both of the brake force of the pair of the brake systems, even in a state where the control unit performs the interlocking control so as to decrease the brake force of one of the brake system as the brake force of the other or the brake system is increased in accordance with the predetermined distribution ratio. Therefore, in a state where the front and rear wheels of the vehicle are braked interlockingly in the vicinity of the maximum brake force based on the ideal brake force distribution curve, for example, when the brake operating member on the front wheel side acting as one of the two brake systems is released, the brake force of the brake operating member on the rear wheel side acting as the other brake system is controlled to be decreased. That is, the brake force on the rear wheel side is gradually decreased together with the brake force of the brake operating member on the front wheel side. Due to this, in the process where the brake forces of the pair of brake systems (front and rear wheels) decrease, there is eliminated the occurrence of the conventional phenomenon that the brake force of one of the two brake systems (rear wheel) rises temporarily. Accordingly, when one brake operating member is released from the state where the brake forces of the pair of brake systems are interlockingly controlled according to the predetermined distribution ratio, there is reduced the possibility of giving the rider uncomfortable feeling, to thereby enhance the riding feeling of the vehicle.

Also, the decreasing control by the control unit may be preferably structured such that the decreasing control of the control unit is to decrease both of the brake force of the pair of the brake systems at the same ratio.

According to the above-structured vehicular brake control system, since the decreasing control by the control unit decreases the brake forces applied to the pair of brake systems at the same ratio, smooth releasing of the brake force in the pair of brake systems is realized. This not only enables to reduce the possibility of giving a rider uncomfortable feeling but also to enhance the riding feeling of the vehicle.

According to a vehicular brake control system of the invention, in a vehicle in which the brake force of the pair of brake systems are controlled interlockingly according to the predetermined distribution ratio, the possibility of giving the rider uncomfortable feeling in the brake force releasing time is reduced and thus the riding feeling of the vehicle is enhanced.

BRIEF DESCRIPTION OF THE DRAWINGS

FIG. 5 is an explanatory flow chart for execution of the interlocking control of the invention.

DETAILED DESCRIPTION OF THE PREFERRED EMBODIMENTS

Now, description will be given below in detail of the best mode for carrying out the invention with reference to the accompanying drawings. By the way, in the following description, the same elements are given the same designations and thus the duplicate description thereof is omitted.

Figure 1:
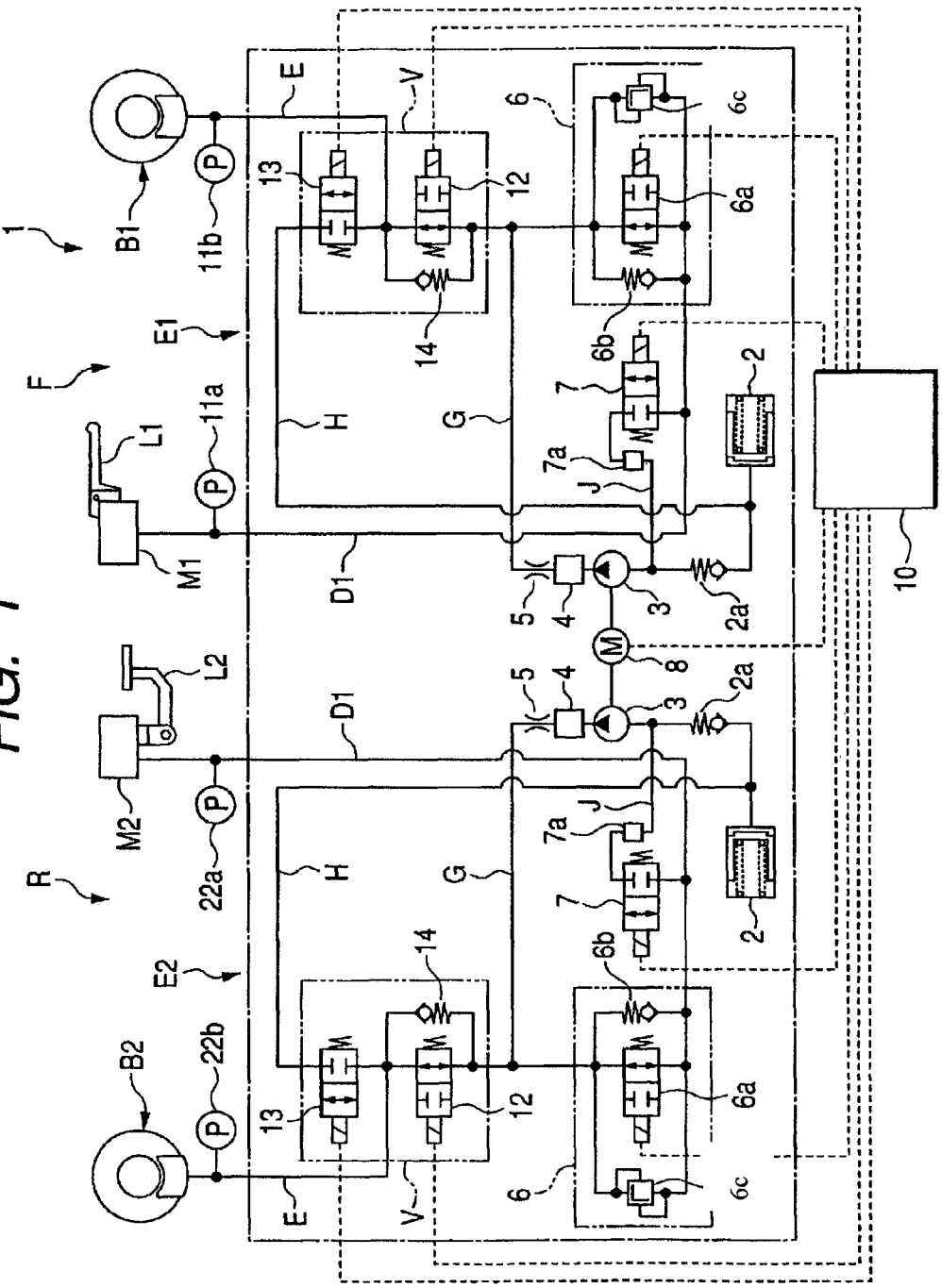
FIG. 1 is a brake hydraulic pressure circuit diagram, showing a vehicular brake control system according to an embodiment of the invention.
Figure 2:
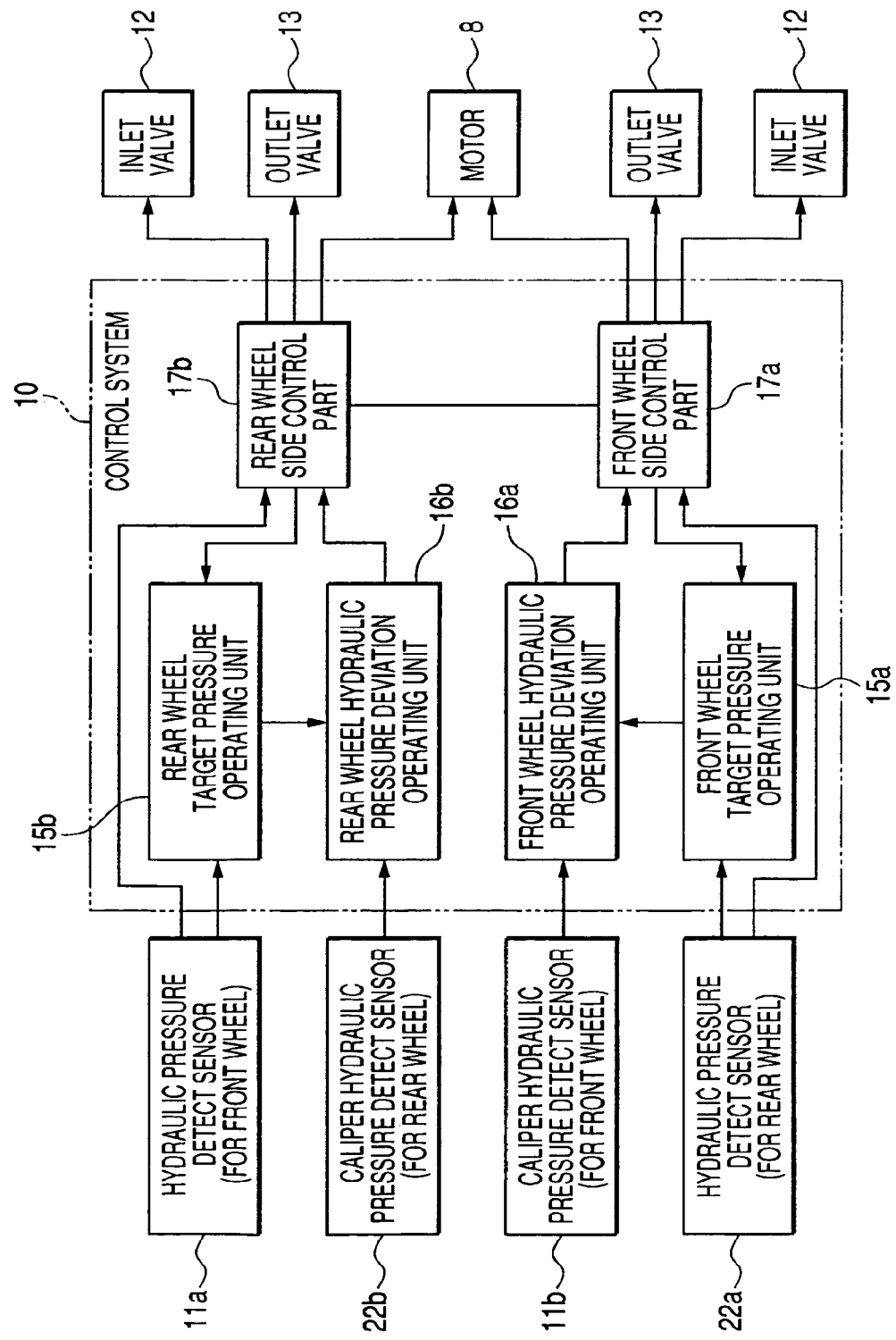
FIG. 2 is a block diagram of the main components of a control system employed in the embodiment.

In the drawings, FIG. 1 is a brake hydraulic pressure circuit diagram for a vehicular brake control system according to an embodiment of the invention, and FIG. 2 is a block diagram of the main components of a control system employed in the vehicular brake control system.

A vehicular brake control system 1 is suitably used in a bar-handle type vehicle such as a motorcycle, a tricycle, and an all-terrain vehicle (ATV), and is used to control properly brake force (brake hydraulic pressure) which are applied to the front and rear wheels of a vehicle (not shown). In the following embodiment, description will be given of an embodiment in which the vehicular brake control system 1 is applied to a motorcycle.

As shown in FIG. 1, the vehicular brake control system 1 includes two brake systems respectively disposed on the front wheel side F and rear wheel side R, and further includes a control unit 10 which is used to properly control various parts provided in the two brake systems. In the brake system on the front wheel side F, between a master cylinder M1 for outputting hydraulic pressure corresponding to an operation of a brake lever L1 serving as a brake operating member and a front wheel brake B1 mounted on the front wheel of a motorcycle (not shown), there is interposed a brake hydraulic pressure adjust unit E1 which is capable of adjusting the brake hydraulic pressure of the front wheel brake B1. Also, in the brake system on the rear wheel side R, between a master cylinder M2 for outputting hydraulic pressure corresponding to an operation of a brake pedal L2 serving as a brake operating member and a rear wheel brake B2 mounted on the rear wheel of a motorcycle (not shown), there is interposed brake hydraulic pressure adjust unit E2 capable of adjusting the brake hydraulic pressure of the rear wheel brake B2. As described above, the vehicular brake control system 1 is composed of the two systems, that is, the front wheel brake B1 and rear wheel brake B2. However, since the two systems are composed of the same structural parts, in the following description, the system related to the front wheel brake B1 will be mainly described, whereas the system related to the rear wheel brake B2 will be described only as the need arises.

The master cylinder M1 includes a cylinder (not shown) to which is connected a brake fluid tank chamber (not shown) for storing brake fluid therein; and, to the inside of the cylinder, there is assembled a rod piston (not shown) which is slid in the axial direction of the cylinder due to the operation of the brake lever L1 to charge the brake fluid out of the brake fluid tank chamber. Here, the master cylinder M2 on the rear wheel side R is different from the master cylinder M1 in that the brake pedal L2 is connected to the master cylinder M2. In hydraulic pressure passages coming from these master cylinders M1 and M2, there are provided hydraulic pressure detect sensors 11a and 22a respectively for detecting their associated brake pressure. The measurement results of the hydraulic pressure detect sensors 11a and 22a are taken into the control unit 10. Then, the control unit 10 judges whether the brake lever L1 and brake pedal L2 are operated or not.

The brake hydraulic pressure adjust unit E1 includes a reservoir 2, a pump 3, a damper 4, an orifice 5, a regulator 6 and a suction valve 7 and, further includes a common motor 8 which is commonly used to drive the respective pumps 3 of the front wheel brake B1 and rear wheel brake B2. Also, the brake hydraulic pressure adjust unit E1 includes control valve unit V which controls the brake hydraulic pressure to be applied to the front wheel brake B1.

By the way, in the following description, a fluid passage reaching the regulator 6 through the master cylinder M1 (M2) is referred to as an output fluid passage D1, whereas an fluid passage coming from the regulator 6 and reaching the front wheel brake B1 is referred to as a wheel hydraulic pressure passage E. Also, an fluid passage starting from the output hydraulic pressure passage D1 and reaching the pump 3 is referred to as a suction hydraulic pressure passage J, a fluid passage from the pump 3 to the wheel hydraulic pressure passage E is referred to as a discharge hydraulic pressure passage G, and an fluid passage from the wheel hydraulic pressure passage E to the reservoir 2 is referred to as a release passage H.

The control valve unit V functions as a switching device for switching the following states; that is, a state in which the release passage H is cut off while the wheel hydraulic pressure passage E is opened, a state in which the release passage H is opened while the wheel hydraulic pressure passage E is cut off, and a state in which the release passage H is cut off while the wheel hydraulic pressure passage E is cut off. The control valve unit V includes an inlet valve 12, an outlet valve 13 and a check valve 14.

The inlet valve 12 is a normally open type electromagnetic valve which is provided in the wheel hydraulic pressure passage E. Since it is normally open, the inlet valve 12 allows the brake hydraulic pressure to be transmitted from the master cylinder M1 through the output hydraulic pressure passage D1 to the front wheel brake B1. Also, because the control unit 10 closing the inlet valve 12 when the front wheel is going to be locked (anti-lock brake control), the inlet valve 12 cuts off the brake fluid to be transmitted from the master cylinder M1 to the front wheel brake B1.

The outlet valve 13 is a normally closed type electromagnetic valve, which is interposed between the wheel hydraulic pressure passage E and release passage H. Although it is normally closed, when the wheel is going to be locked, the outlet valve 13 is opened by the control unit 10 (anti-lock brake control) to thereby relieve the brake pressure acting on The front wheel brake B1 to the reservoir 2.

The check valve 14 is connected in parallel to the inlet valve 12. The check valve 14 is a valve which allows only the flow of the brake fluid from the front wheel brake B1 side to the regulator 6 side. When an input from the brake lever L1 is removed, even if the inlet valve 12 is closed, the check valve 14 allows the brake fluid flows from the front wheel brake B1 side to the regulator 6 side.

The reservoir 2 is provided in the release passage H and functions as an absorber which absorbs the brake hydraulic pressure relieved due to the opened outlet valve 13. Also, between the reservoir 2 and suction hydraulic pressure passage J, there is interposed a check valve 2a which allows only the brake fluid flows from the reservoir 2 side to the pump 3 side.

The pump 3 is interposed between the suction fluid passage J communicating with the output hydraulic pressure passage D1 and the discharge hydraulic pressure passage G communicating with the wheel hydraulic pressure passage E; and, as described above, it has the function to suck in the brake fluid stored in the reservoir 2 and to discharge it to the discharge hydraulic pressure passage G. Owing to such operation of the pump 3, the brake hydraulic pressure is transmitted to the wheel hydraulic pressure passage E. Also, the brake fluid sucked into the reservoir 2 is returned through the discharge hydraulic pressure passage G to the master cylinder M1 or is supplied through the wheel hydraulic pressure passage E to the front wheel brake B1. By the way, after completion of the brake operation by the brake lever L1, since a cut valve 6a (which will be discussed later) allows the brake fluid flows from the wheel hydraulic pressure passage E to the output hydraulic pressure passage D1, the brake fluid flown into the wheel hydraulic pressure passage E is returned through the output hydraulic pressure passage D1 to the master cylinder M1.

The damper 4 and orifice 5 cooperate together to damp pulsation of the pressure of the brake fluid discharged from the pump 3. This reduces an operation noise resulting from such the pressure pulsation.

The regulator 6 functions to switch two states over to each other, one state allowing the flow of the brake fluid from the output hydraulic pressure passage D1 to the wheel hydraulic pressure passage E, the other state cutting off the flow of such brake fluid. Also, the regulator 6 functions to adjust the brake hydraulic pressures of the wheel hydraulic pressure passage E and discharge hydraulic pressure passage G down to their respective preset values or less, when the brake fluid flows from the output hydraulic pressure passage D1 to the wheel hydraulic pressure passage E is cut off. And, the regulator 6 includes a cut valve 6a, a check valve 6b and a relief valve 6c.

The cut valve 6a is an electromagnetic valve of a normally open type which is interposed between the output hydraulic pressure passage D1 communicating with the master cylinder M1 and the wheel hydraulic pressure passage E communicating with the front wheel brake B1. The cut valve 6a is used to switch two states over to each other, one state allowing the brake fluid flows from the output hydraulic pressure passage D1 to the wheel hydraulic pressure passage E, the other cutting off the flow of such brake fluid. The cut valve 6a is controlled by the control unit 10 so as to be cut off (closed) when the pump 3 is in operation, whereby the cut valve 6a cuts off the direct transmission of the brake hydraulic pressure (which is applied from the master cylinder M1) from the output hydraulic pressure passage D1 to the wheel hydraulic pressure passage E. Owing to this, the brake fluid, as will be described later, is sucked from the output hydraulic pressure passage D1 through the suction hydraulic pressure passage J (suction valve 7) into the pump 3. Also, as the pump 3 is caused to stop its operation, the cut valve 6a is deenergized and brought into communication with the output hydraulic pressure passage D1 and wheel hydraulic pressure passage E (opened). As a result, the brake fluid is returned from the wheel hydraulic pressure passage E through the cut valve 6a to the output hydraulic pressure passage D1.

The check valve 6b is connected in parallel to the cut valve 6a. The check valve 6b is a valve which allows only the brake fluid flows from the output hydraulic pressure passage D1 to the wheel hydraulic pressure passage E. Thus, even when the wheel is locked due to a defect or the like while the cut valve 6a is closed, the check valve 6b allows the brake fluid flows from the output hydraulic pressure passage D1 to the wheel hydraulic pressure passage E.

The relief valve 6c is added to the cut valve 6a as a function thereof. The relief valve 6c controls a current value to be applied to the electromagnetic coil (not shown) of the cut valve 6a to thereby control the valve opening pressure thereof and is opened as the brake pressures of the wheel hydraulic pressure passage E and discharge hydraulic pressure passage G reach or exceed their set values.

The suction valve 7 is an electromagnetic valve of a normally closed type which is disposed in the suction hydraulic pressure passage J. The suction valve 7 is used to switch two states over to each other, one state for opening the suction hydraulic pressure passage J, the other for cutting off the passage J. The suction valve 7 is released (opened) by the control unit 10 with the activation of the pump 3, and is cut off (closed) with the stop of the operation of the pump 3. Also, in the suction hydraulic pressure passage J, there is formed a storage chamber 7a which stores the brake fluid therein.

The control unit 10 controls mainly the operations of the inlet valve 12, outlet valve 13, regulator 6 and suction valve 7 of the above-mentioned control valve unit V as well as the operation of the motor 8. The control unit 10 adjusts and controls the brake forces of the two brake systems mainly in an interlocking manner. That is, when one of the brake lever L1 and brake pedal L2 is operated, the control unit 10 executes interlocking control to apply the brake force to the front wheel brake B1 or rear wheel brake B2 in the brake system on the side that is different from the side operated.

Next, description will be given below of the structure of the parts of the control unit 10 associated with the interlocking control of the brake force with reference to FIGS. 2 and 1. The control unit 10 includes a front wheel target pressure operating unit 15a, front wheel hydraulic pressure deviation operating unit 16a and a front wheel side control part 17a respectively corresponding to the brake hydraulic pressure adjust unit E1 on the front wheel side F. In addition, the control unit 10 includes a rear wheel target pressure operating unit 15b, rear wheel hydraulic pressure deviation operating unit 16b and a rear wheel side control part 17b respectively corresponding to the brake hydraulic pressure adjust unit E2 on the rear wheel side R. In the control unit 10 as well, the mutually corresponding structures of the front wheel side F and rear wheel side R are the same. Thus, explanations on the same parts are omitted and description will be given hereinbelow of a case where the rear wheel brake B2 on the rear wheel side R is controlled in an interlocking manner with the frontwheel brake B1 to which the brake force is applied with the operation of the brake lever L1.

The rear wheel target pressure operating unit 15b receives the output signal of the hydraulic pressure detect sensor (for the front wheel) 11a and operates a rear wheel target pressure. Here, the rear wheel target pressure operating unit 15b is structured so as to operate rear wheel target pressure corresponding to the state of the brake hydraulic pressure under the control of the rear wheel side control part 17b, as will be discussed later in detail.

The rear wheel hydraulic pressure deviation operating unit 16b receives the rear wheel target pressure obtained by the rear wheel target pressure operating unit 15b and the output signal of a caliper hydraulic pressure detect sensor 22b on the rear wheel side R and operates the deviation of the rear wheel hydraulic pressure.

The rear wheel side control part 17b receives the output signal of the hydraulic pressure detect sensor (for the front wheel) 11a; and detects whether the brake hydraulic pressure of the brake system on the front wheel side F is in an increasing state or in a decreasing state or in a maintaining state. Then, the rear wheel side control part 17b also controls the rear wheel target pressure operating unit 15b such that a rear wheel target pressure is operated in accordance with such detection result, and performs driving control on the control valve unit V and the like on the rear wheel side R.

Figure 3A:
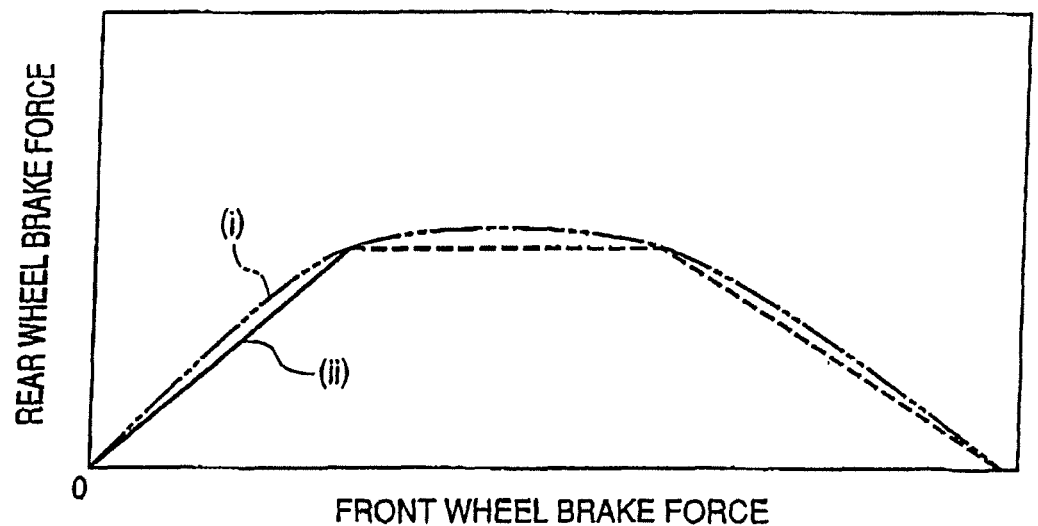
FIG. 3A is a graph showing the brake force characteristics of front and rear wheels.

In other words, when the rear wheel side control part 17b detects that the hydraulic pressure of the brake system on the front wheel side F is in an increasing state, it controls the rear wheel target pressure operating unit 15b such that the interlocking control of the brake forces of the front and rear wheels is executed in accordance with a distribution line (ii) shown in FIG. 3A as a predetermined distribution ratio line extremely approximate to the ideal brake force distribution curve (i) shown in FIG. 3A.

Here, in FIG. 3A, the horizontal axis (i.e., x-coordinate or abscissa) represents the front wheel brake force, whereas the vertical axis (i.e., y-coordinate or ordinate)represents the rear wheel brake force. Also, in the distribution ratio line (ii), the portion thereof shown by a dotted line is a maintaining portion containing the interlocking control state in which the brake force on the rear wheel side R thereof stands (i.e., is in a maintaining state) and decreasing portion containing the interlocking control state in which the brake force on the rear wheel side decreases as the brake force of the brake lever L1 increases. (This definition also applies similarly in FIG. 3B and FIGS. 4A, 4B).

Figure 3B:
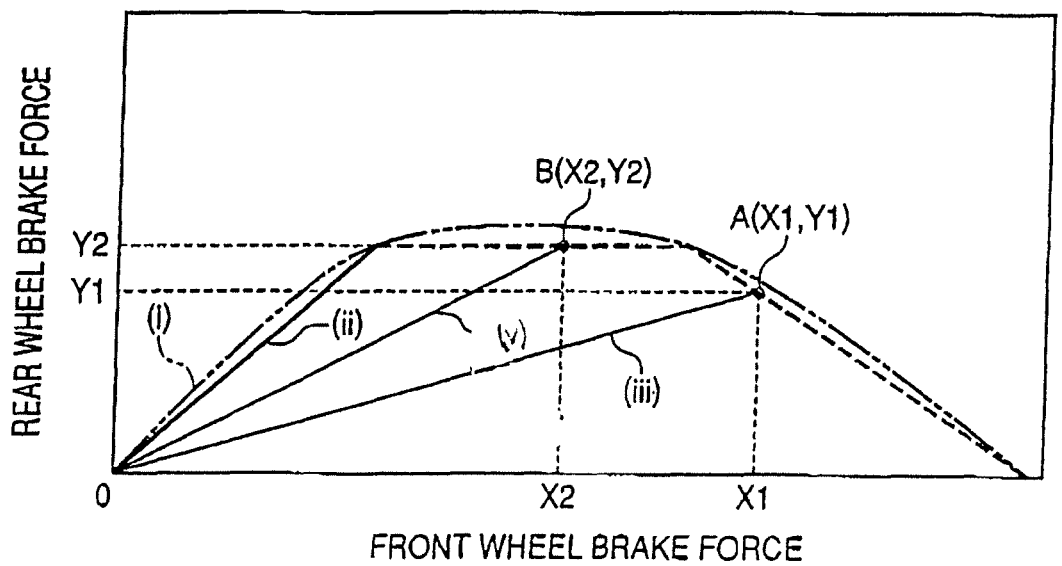
FIG. 3B is also a graph showing the brake force characteristics of front and rear wheels.

Also, when the rear wheel side control part 17b detects from the output signal of the hydraulic pressure detect sensor 11a (for the front wheel) that the brake pressure is in a decreasing state (that is, when the rear wheel side control part 17b detects that the force applied by the rider to the brake lever L1 is released), the rear wheel side control part 17b cooperates together with the front wheel side control part 17a to control to decrease both of the brake force to be applied to the front and rear wheels at a same ratio. For example, as shown in FIG. 3B, in a state where the interlocking control of the brake force is under execution at coordinates A (X1, Y1) on the distribution line (ii) (in the interlocking control state where the brake force on the rear wheel side R decreases as the brake force of the brake lever L1 increases), when the brake lever is loosened, the rear wheel side control part 17b and front wheel side control part 17a execute such decreasing control that both of the brake forces applied to the front and rear wheels gradually decrease from the coordinates A (X1, Y1) toward the origin 0. That is, the rear wheel side control part 17b and front wheel side control part 17a control the rear wheel target pressure operating unit 15b such that the target pressure of the rear wheel is set in accordance with the function of a straight line (iii) passing through the origin 0 and the coordinates A (X1, Y1).

Also, for example, as shown in FIG. 3 B, in a state where the interlocking control of the brake force is under execution at coordinates B (X2, Y2) on the distribution line (ii), when the brake lever L1 is loosened, the rear wheel side control part 17b and front wheel side control part 17a execute such decreasing control that both of the brake forces applied to the front and rear wheels gradually decrease from the coordinates B (X2, Y2) toward the origin 0. That is, the rear wheel side control part 17b and front wheel side control part 17a control the rear wheel target pressure operating unit 15b such that the target pressure of the rear wheel is set in accordance with the function of a straight line (v) passing through the origin 0 and the coordinates B (X2, Y2).

Figure 4A:
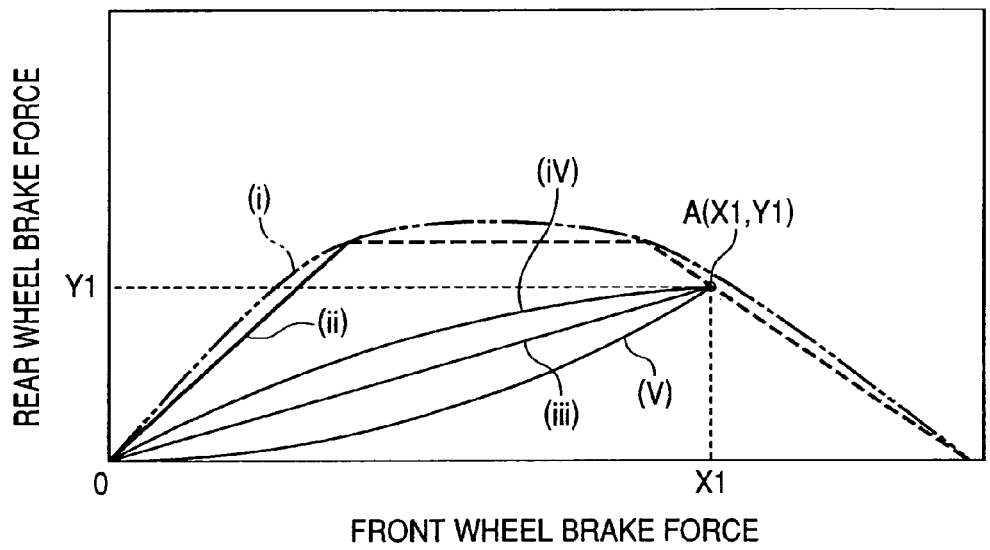
FIG. 4A is a graphical representation showing the brake force characteristics of front and rear wheels.

By the way, such control to be executed by the rear wheel side control part 17b and front wheel side control part 17a is not limited to the control that is executed in accordance with the function of the straight line (iii), but also be employed other type of decreasing control, provided that it decreases both of the brake forces of the front and rear wheels. For example, as shown in FIG. 4A, the decreasing control may be executed in accordance with the function of a curve (iv) passing through the origin 0 and coordinates A (X1, Y1) (where, 0<Y<Y1); or, the decreasing control may be executed in accordance with the function of a curve (v) similarly passing through the origin 0 and coordinates A (X1, Y1) (where, 0<Y<Y1) Further, for proper execution of the decreasing control based on which one of these functions, the control unit 10 may also be structured so as to be inputted the speed of the vehicle, the friction of the road and the like and thus, with these factors taken into consideration, to thereby select a proper function from the above-mentioned functions.

And, when the rear wheel side control part 17b detects from the output signal of the hydraulic pressure detect sensor (for the front wheel) 11a that the brake pressure is in a maintaining state, the rear wheel side control part 17b controls the rear wheel target pressure operating unit 15b so that the rear wheel target pressure is set with the same characteristic as the previous one. In other words, when the brake pressure is set in a maintaining state after it has been in an increasing state, the rear wheel side control part 17b controls the rear wheel target pressure operating unit 15b in such a manner that the interlocking control is continued in accordance with the function of the distribution line (ii) shown in FIG. 3A. When the brake pressure is set in a maintaining state after the brake pressure has been in a decreasing state, the rear wheel side control part 17b controls the rear wheel target pressure operating unit 15b in such a manner that the decreasing control of the brake force is executed, for example, in accordance with the function of the distribution line (iii) shown in FIG. 3B.

In order to enable to execute controls corresponding to the above-mentioned respective states, the rear wheel side control part 17b decides the brake hydraulic pressure control amount of the rear wheel brake B2 based on the deviation of the rear wheel hydraulic pressure operated by the rear wheel hydraulic pressure deviation operating unit 16b. Also, the rear wheel side control part 17b, in accordance with the thus controls to drive the control valve unit V and regulator 6 on decided brake hydraulic pressure control amount, not only the rear wheel side R but also controls and operates the motor 8 by a given amount.

Although not shown, when the rear wheel side control part 17b receives the output signal of the hydraulic pressure detect sensor (for the front wheel) 11a and the output signal of the hydraulic pressure detect sensor (for the rear wheel) 22a (that is, when the rear wheel side control part 17b detects that the brake lever L1 and brake pedal L2 are both operated and thus the brake force resulting from the operating power is applied to the brake system on the rear wheel side R as well), the rear wheel side control part 17b decides a brake hydraulic pressure control amount corresponding to a difference obtained by subtracting the inputted brake hydraulic pressure of the rear wheel brake B2. Then the rear wheel side control part 17b controls to drive the control valve unit V and regulator 6 on the rear wheel side R, and also controls to operate the motor 8 in such a manner that the interlocking control of the brake force along the above-mentioned distribution line (ii) is executed.

The rear wheel side control part 17b also is structured such that, only when the output signal from the hydraulic pressure detect sensor (for the front wheel) 11a exceeds a given value (that is, only when the brake force applied to the brake system on the front wheel side F reaches a given value of brake force), the rear wheel side control part 17b executes the interlocking control so as to apply the brake force to the brake system on the rear wheel side R.

Also, the control unit 10 executes anti-lock brake control when there occurs a state in which the front wheel or rear wheel is going to be locked. For example, when the control unit 10 detects that the brake hydraulic pressure of the front wheel rises and the front wheel brake force is going into a lock state during execution of the interlocking control of the brake force by detecting a slip ratio or the like, the control unit 10 operates the control valve unit V on the front wheel side F and motor 8 to increase or decrease the brake hydraulic pressure to be applied to the front wheel brake B1 thus, the anti-lock brake control is performed. The anti-lock brake control is carried out independently in the front and rear wheels.

Next, description will be given below of the operation of the above-structured vehicular brake control system 1 with reference to a flow chart shown in FIG. 5. In the following description, description will be given of an embodiment in which the rear wheel side R is controlled interlockingly by operating the brake lever L1.

In the vehicular brake control system 1, the hydraulic pressure on the side, where the brake lever L1 or brake pedal L2 is operated, is detected to thereby detect whether the thus detected hydraulic pressure is in an increasing state, or in a decreasing state, or in a maintaining state with respect to the previous state, and a suitable control for the detected state of the hydraulic pressure is executed. That is, the control requested by a rider is judged according to the hydraulic pressure on the side where the brake lever L1 or brake pedal L2 is operated. Also, in accordance with the thus judged control, the above-mentioned interlocking control or decreasing control is executed.

Firstly, when the brake lever L1 is operated while the vehicle is running, the hydraulic pressure is supplied from the master cylinder M1 through the output hydraulic pressure passage D1 to the front wheel brake B1 to thereby brake the front wheel. Then, the brake hydraulic pressure is detected by the hydraulic pressure detect sensor 11a (Step S1) and a signal of the thus detected brake hydraulic pressure is transmitted to the rear wheel target pressure operating unit 15b and rear wheel side control part 17b.

Here, on receiving the detect signal of the hydraulic pressure detect sensor 11a, the rear wheel side control part 17b checks whether the brake hydraulic pressure of the brake system on the front wheel side F is in an increasing state, in a decreasing state, or in a maintaining state (Step S2) with respect to the previous state. When the brake hydraulic pressure of the previous state is not extracted the state of the brake hydraulic pressure is checked in accordance with two data that are extracted continually at given intervals.

When in Step S2, the brake hydraulic pressure is judged to be in an increasing state, that is, the brake lever L1 is pulled and braking is requested, the rear wheel side control part 17b controls the rear wheel target pressure operating unit 15b to set up a rear wheel target pressure in accordance with the distribution characteristic so that the brake forces of the front and rear wheels are to be controlled interlockingly in accordance with the distribution line (ii) shown in FIG. 3A (Step S3). In response to this, the rear wheel target pressure operating unit 15b operates a rear wheel target pressure by the detect signal input from the hydraulic pressure detect sensor 11a, and outputs the thus operated rear wheel target pressure to the rear wheel hydraulic pressure deviation operating unit 16b. At this time, the brake hydraulic pressure on the rear wheel side R is detected by the caliper hydraulic pressure detect sensor 22b (on the rear wheel side) (Step S4), and a signal of the thus detected brake hydraulic pressure is output to the rear wheel hydraulic pressure deviation operating unit 16b.

On receiving the rear wheel target pressure input from the rear wheel target pressure operating unit 15b and the signal of the detected brake hydraulic pressure output by the caliper hydraulic pressure detect sensor 22b on the rear wheel side R, the rear wheel hydraulic pressure deviation operating unit 16b operates the deviation of the rear wheel hydraulic pressure (Step S5), and outputs the thus operated deviation of the rear wheel hydraulic pressure to the rear wheel side control part 17b.

The rear wheel side control part 17b decides the brake hydraulic pressure control amount of the rear wheel brake B2 in accordance with the deviation of the rear wheel hydraulic pressure operated by the rear wheel hydraulic pressure deviation operating unit 16b (Step S6). Also, the rear wheel side control part 17b controls and operates the control valve unit V and the like in accordance with the thus decided brake hydraulic pressure control amount (Step S7).

That is, when the brake lever L1 is pulled and braking is requested, the brake hydraulic pressure is controlled in this manner.

Next, in Step S2, when the brake fluid pressure is judged to be in a decreasing state, that is, the brake lever L1 is released, the processing goes to Step S9, where the rear wheel side control part 17b controls the rear wheel target pressure operating unit 15b so that the rear wheel target pressure operating unit 15b calculates a decreasing pressure characteristic and sets up a rear wheel target pressure corresponding to the thus calculated decreasing pressure characteristic. Specifically, the rear wheel side control part 17b cooperates together with the front wheel side control part 17a to control the rear wheel target pressure operating unit 15b so that, for example, both of the brake forces, which are respectively applied to the front and rear wheels in accordance with the function of the straight line (iii) shown in FIG. 3B, are allowed to reduce at the same ratio. After then, processings in Steps S4 to Step S7 are carried out, thereby enforcing the control necessary when the brake lever L1 is released.

And, in Step S2, when the brake hydraulic pressure is judged to be in a maintaining state, the processing goes to Step S8, where the rear wheel side control part 17b controls the rear wheel target pressure operating unit 15b so that a rear wheel target pressure is set up with the same characteristic as the previous state. That is, when the brake hydraulic pressure is in a maintaining state after it has been in an increasing state, the rear wheel side control part 17b controls the rear wheel target pressure operating unit 15b so that the interlocking control is continued in accordance with the distribution line (ii) shown in FIG. 3A. When the brake hydraulic pressure is judged in a maintaining state after it has been in a decreasing state, the rear wheel side control part 17b controls the rear wheel target pressure operating unit 15b so that the brake force is controlled to be reduced in accordance with the function of the straight line (iii) shown in FIG. 3B.

Figure 4B:
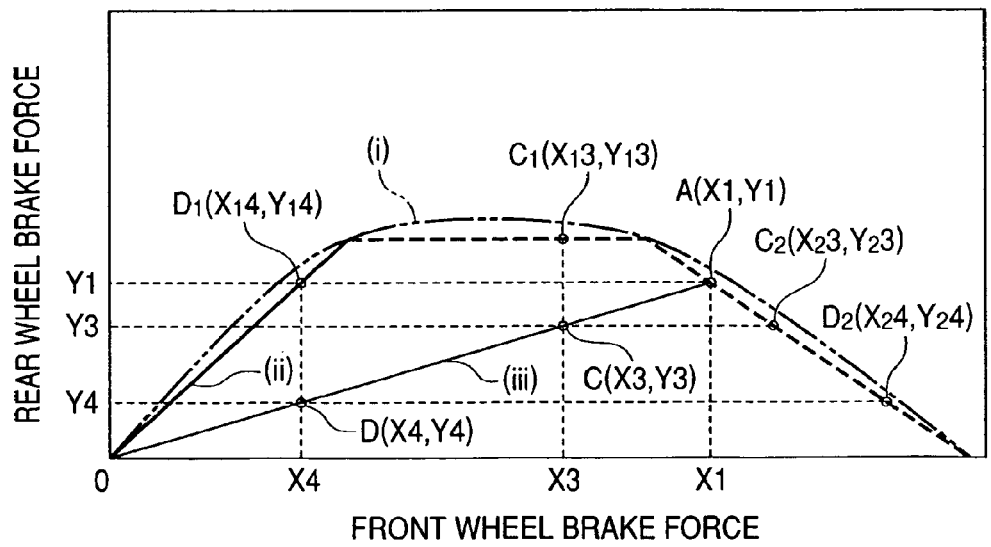
FIG. 4B is also a graph showing the brake force characteristics of front and rear wheels.

Here, when the brake lever L1 is gripped again while it is being released, in Step S2, the brake hydraulic pressure is judged to be in an increasing state, then, processing in Steps S3-S7 are executed. At this time, for example, as shown in FIG. 4B, while the brake lever L1 is being released in accordance with the function of the straight line (iii) passing through the origin 0 and coordinates A (X1, Y1), when the brake lever L1 is gripped again at the time of coordinates C (X3, Y3), a rear wheel target pressure is properly set between coordinates $C_1$ ($X_1 3, Y_1 3$) and coordinates $C_2$ ($X_2 3, Y_2 3$) on the distribution line (ii) corresponding to the coordinates C (X3, Y3). Based on the thus set rear wheel target pressure, the rear wheel side control part 17b interlockingly controls the brake on the rear wheel side R.

Also, as shown in FIG. 4B, while the brake lever L1 is released in accordance with the function of the straight line (iii) similar to the above case, when the brake lever L1 is gripped again at the time of coordinates D (X4, Y4) near to the origin 0, a rear wheel target pressure is properly set between coordinates $D_1$ ($X_1 4, Y_1 4$) and coordinates $D_2$ ($X_2 4, Y_2 4$) on the distribution line (ii) corresponding to the coordinates D (X4, Y4).

Note that, also when the brake pedal L2 on the rear wheel side R is operated, similar control to the above case is to be executed. That is, in accordance with the output signal of the hydraulic pressure detect sensor 22a (for the rear wheel), the front wheel side control part 17a judges the above-mentioned respective states of the brake hydraulic pressure and controls the front wheel target pressure operating unit 15a based on the judgment. In accordance with the target hydraulic pressure operated by the front wheel target pressure operating unit 15a and the output signal transmitted from the caliper hydraulic pressure detect sensor 11b on the front wheel side F, the front wheel hydraulic pressure deviation operating unit 16a operates the deviation of the front wheel hydraulic pressure, the front wheel side control part 17a decides the brake hydraulic pressure control amount of the front wheel brake B1 based on the thus operated deviation of the front wheel hydraulic pressure. In accordance with the thus decided brake hydraulic pressure control amount, the front wheel side control part 17a controls to drive the control valve unit V and regulator 6 as well as controls to operate the motor 8 by a given amount.

Also, when the brake lever L1 and brake pedal L2 are operated simultaneously and the front and rear wheels are both braked by the front wheel brake B1 and rear wheel brake B2 respectively connected to their associated brake systems, For example, setting the input of the brake lever L1 on the front wheel side F as a reference, the rear wheel target pressure is calculated by the rear wheel target pressure operating unit 15b, the brake hydraulic pressure control amount of the rear wheel is calculated in accordance with the deviation of the rear wheel hydraulic pressure calculated by the rear wheel hydraulic pressure deviation operating unit 16b. Based on the thus calculated brake hydraulic pressure control amount, not only the control valve unit V on the rear wheel side R is controlled to be driven but also the motor 8 is controlled to be driven.

According to the above-described vehicular brake control system 1, when one of the brake lever L1 and brake pedal L2 is operated, the brake forces are interlockingly controlled according to a predetermined distribution ratio by the control unit 10 (front wheel side control part 17a and rear wheel side control part 17b). During execution of the interlocking control, for example, when the brake lever L1 is operated or loosened, the control unit 10 front wheel side control part 17a and rear wheel side control part 17b) executes a decreasing control on the brake forces. That is, the control unit 10 reduces both of the brake forces of the brake systems on the front wheel side F and on the rear wheel side R, even in a state where the control system performs the interlocking control so as to decrease the brake force on the rear wheel side R as the brake force on the brake lever L1 is increased, in accordance with the predetermined distribution ratio. Therefore, during the releasing operation of the brake lever L1, there is eliminated the occurrence of an inconvenience that the brake force of the brake system on the rear wheel side R increases temporarily as conventional. Thus, when the brake lever is released from the state of the interlocking control in which the brake forces on the front wheel side F and rear wheel side R are interlockingly controlled according to a predetermined distribution ratio, there is reduced the possibility of giving uncomfortable feeling to the rider, which in turn enhances the riding feeling of the vehicle.

Also, since the decreasing control by the control unit 10 decreases the brake forces applied to the front wheel side F and rear wheel side R at the same ratio, the brake forces is released smoothly. This reduces the possibility of giving the rider an uncomfortable feeling as well as enhances the riding feeling of the vehicle.

Although description has been given heretofore of the embodiments of the invention, the invention is not limited to the above-mentioned embodiments but it is enforced in other proper different embodiments.

For example, the invention may apply to a vehicle in which the output hydraulic pressure passage D1 extending from the brake lever L1 to the front wheel brake B1 is brought into communication or may be cut off by a separation valve and, whether the output hydraulic pressure passage D1 is allowed to communicate or cut off by the separation valve, a braking operation due to the hydraulic pressure of the brake fluid is possible on the front wheel brake B1 side.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A brake control system for a vehicle, comprising:
   first and second operating members;
   a first brake system connected to the first operating members;
   a second brake system connected to the second operating members; and
   a control unit which performs interlocking control of the first and second brake system in such a manner that:
      when increasing brake force of the first brake system, changing brake force of the second brake system in accordance with a predetermined distribution ratio;
      when decreasing the brake force of the first brake system, decrease the brake force of the second brake system so as to directly become zero regardless of the predetermined distribution ratio.

2. The brake control system for the vehicle as set forth in claim 1, wherein
   the first brake system applies brake force onto a front wheel, and
   the second brake system applies brake force onto a rear wheel.

3. The brake control system for the vehicle as set forth in claim 1, wherein
   the brake force of the first brake system decreases at a same ratio, and
   the brake force of the second brake system decreases at the same ratio.

* * * * *